United States Patent [19]

LeBihan

[11] Patent Number: 5,606,634
[45] Date of Patent: Feb. 25, 1997

[54] DISPLAY UNIT FOR CONVERSION OF A LASER BEAM INTO VISIBLE AND INCOHERENT LIGHT

[75] Inventor: André LeBihan, des Chardonnerets, France

[73] Assignee: Commissariat a l'Energie Atomique, Paris, France

[21] Appl. No.: 602,793

[22] PCT Filed: Sep. 2, 1994

[86] PCT No.: PCT/FR94/01034

§ 371 Date: Mar. 4, 1996

§ 102(e) Date: Mar. 4, 1996

[87] PCT Pub. No.: WO95/06931

PCT Pub. Date: Mar. 9, 1995

[30] Foreign Application Priority Data

Sep. 3, 1993 [FR] France .................................. 93 10514

[51] Int. Cl.⁶ ............................... G02B 6/26; F21V 7/04; G09F 13/18
[52] U.S. Cl. ............................. 385/31; 385/32; 385/38; 385/39; 385/49; 385/123; 385/125; 385/147; 385/901; 362/31; 362/32; 362/259; 362/260; 40/546; 40/547; 372/109
[58] Field of Search ..................... 385/2, 5, 8, 9, 385/14, 15, 16, 18, 24, 31, 38, 39, 32, 49, 88, 89, 123, 125, 147, 901; 362/31, 32, 259, 260; 40/546, 547; 372/109

[56] References Cited

U.S. PATENT DOCUMENTS

| | | | |
|---|---|---|---|
| 4,011,403 | 3/1977 | Epstein et al. | 385/901 X |
| 4,640,592 | 2/1987 | Nishimura et al. | 362/32 X |
| 4,845,596 | 7/1989 | Mouissie | 362/32 |
| 4,907,132 | 3/1990 | Parker | 362/32 |
| 4,961,617 | 10/1990 | Shahidi et al. | 385/901 X |
| 5,016,956 | 5/1991 | Gasparaitis et al. | 385/147 X |
| 5,036,435 | 7/1991 | Tokuda et al. | 362/31 |
| 5,042,892 | 8/1991 | Chiu et al. | 385/901 X |
| 5,249,105 | 9/1993 | Koizumi | 362/31 |
| 5,400,224 | 3/1995 | DuNah et al. | 362/31 |
| 5,448,582 | 9/1995 | Lawandy | 372/42 |
| 5,461,548 | 10/1995 | Esslinger et al. | 362/32 |
| 5,488,696 | 1/1996 | Brosnan | 385/129 |
| 5,528,399 | 6/1996 | Izumi et al. | 385/901 X |
| 5,542,016 | 7/1996 | Kaschke | 385/123 |
| 5,544,268 | 8/1996 | Bischel et al. | 385/4 |

FOREIGN PATENT DOCUMENTS

| | | | |
|---|---|---|---|
| 0187561 | 7/1986 | European Pat. Off. | 385/901 X |
| 2325946 | 4/1977 | France | 385/901 X |
| 1392437 | 4/1975 | United Kingdom | 385/901 X |
| 2168519 | 6/1986 | United Kingdom | 385/901 X |
| WO93/09450 | 5/1993 | WIPO | 385/901 X |
| WO95/06931 | 3/1995 | WIPO | 385/31 |

*Primary Examiner*—Brian Healy
*Attorney, Agent, or Firm*—Oblon, Spivak, McClelland, Maier & Neustadt, P.C.

[57] ABSTRACT

A display unit with the conversion of a laser beam into visible and incoherent light. The unit includes an optical waveguide which transmits a laser beam and at least one element for converting the laser beam into visible and incoherent light which faces the optical waveguide. It also includes at least one security or safety element, which faces the conversion element, which is transparent to the visible and incoherent light and which is able to stop the residual laser beam which may emerge from the conversion element. Accordingly, the visible and incoherent light can be observed through the safety element. The unit may be used with electric signs and markings.

12 Claims, 4 Drawing Sheets

DISPLAY UNIT FOR CONVERSION OF A LASER BEAM INTO VISIBLE AND INCOHERENT LIGHT

BACKGROUND OF THE INVENTION

1. Field of the Invention

The present invention relates to a display unit. It more particularly relates to the field of electric, light signs and markings. For the latter, use has hitherto been made of photoemissive diodes or lamps.

2. Discussion of the Background

It has been forbidden to use lasers, which emit coherent electromagnetic rays, which can give rise to serious injuries to the eyes of observers.

In order to provide protection against the lasers, it is known to use materials able to absorb laser beams, but if in this way users are protected, they are inter alia also deprived of visible information concerning the presence of laser beams.

In order to reveal the presence of a laser beam, use is presently made of complex and costly means requiring electric power to operate. Such means consist e.g. of pilot lamps, photodetectors, electronic cameras and means for measuring power by absorption by a black body.

SUMMARY OF THE INVENTION

The present invention aims at obviating the above disadvantages by proposing a display unit using a laser beam and which permits the display of light or luminous informations and in particular the indication of the presence of a laser beam.

The unit according to the invention supplies an information in visible light, without any danger for observers, said unit being manufacturable in a simple and inexpensive manner and, in numerous embodiments, requires no electric power supply in order to operate.

More specifically, the present invention relates to a display unit, characterized in that it comprises:

an optical waveguide for transmitting a laser beam, at least one element for converting the laser beam into visible and incoherent light, said conversion element being placed in front of the optical waveguide and at least one safety element placed in front of the said conversion element and which is transparent to the visible and incoherent light and able to stop the residual laser beam liable to emerge from the conversion element, so that the visible and incoherent light can be observed through the safety element.

According to a preferred embodiment of the unit according to the invention, said unit also comprises means for applying stresses to the optical waveguide in order to bring about for the latter laser beam losses and the conversion element is exposed to said laser beam losses.

According to an embodiment of the unit according to the invention, the waveguide is curved so as to form at least one sign and the conversion element is placed in front of said sign.

According to another embodiment, the unit according to the invention also comprises a mask, which is opaque to the visible and incoherent light and is positioned in front of the conversion element and perforated by at least one hole forming a sign.

The conversion element can be solid. However, the conversion element can also be a liquid. In this case, the optical waveguide can be placed in said liquid.

BRIEF DESCRIPTION OF THE DRAWINGS

In an embodiment of the invention, the conversion element forms a cladding around the optical waveguide.

The stresses applied to the optical waveguide can be constant as a function of time, or conversely can vary in time.

The conversion element can be of a non-persistent fluorescent material or a persistent phosphorescent material (with memory effect).

Figure 1:
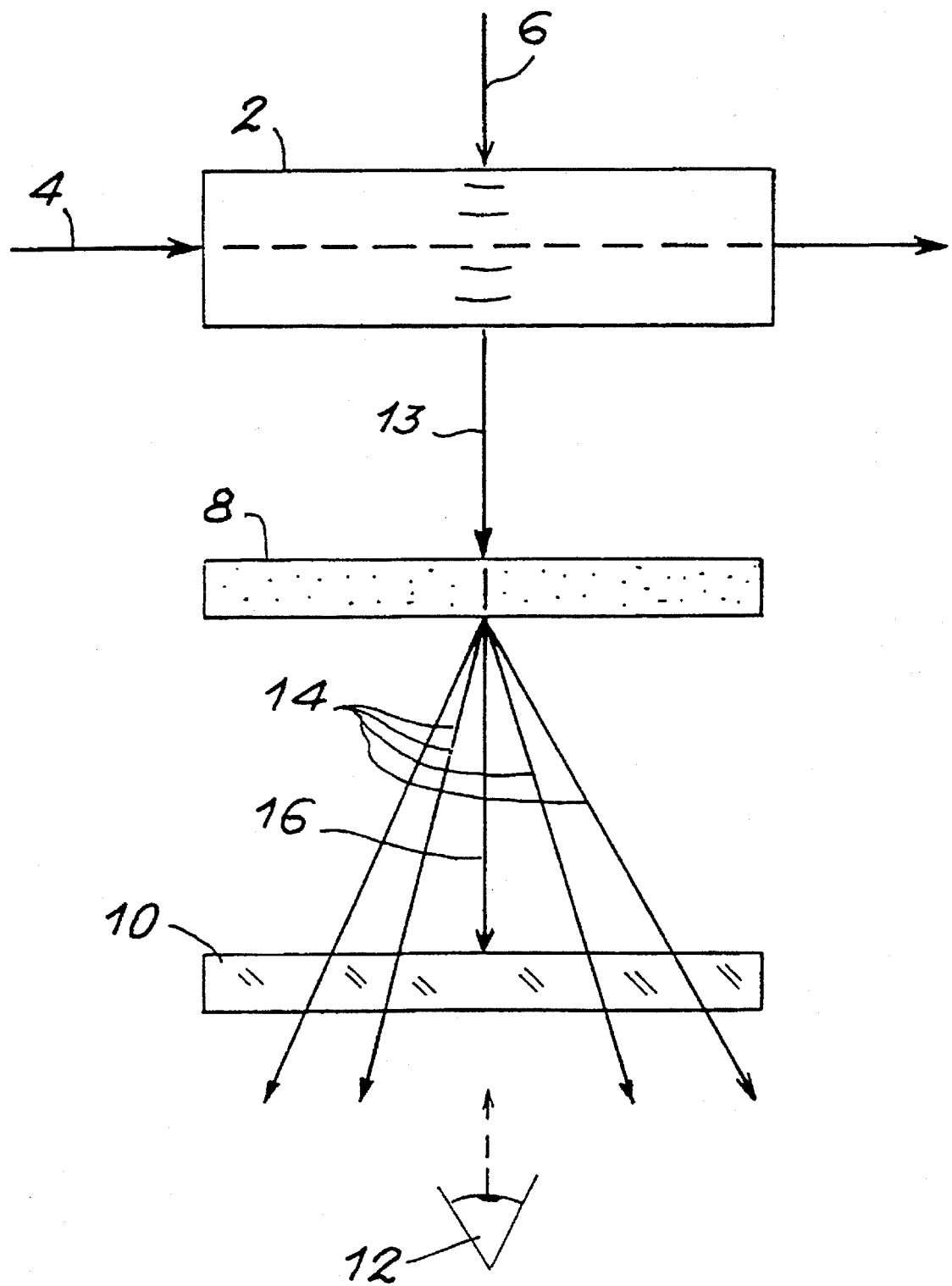

The invention is described in greater detail hereinafter relative to nonlimitative embodiments and with reference to the attached drawings, wherein show:

FIG. 1 Diagrammatically a unit according to the invention.

Figure 2:
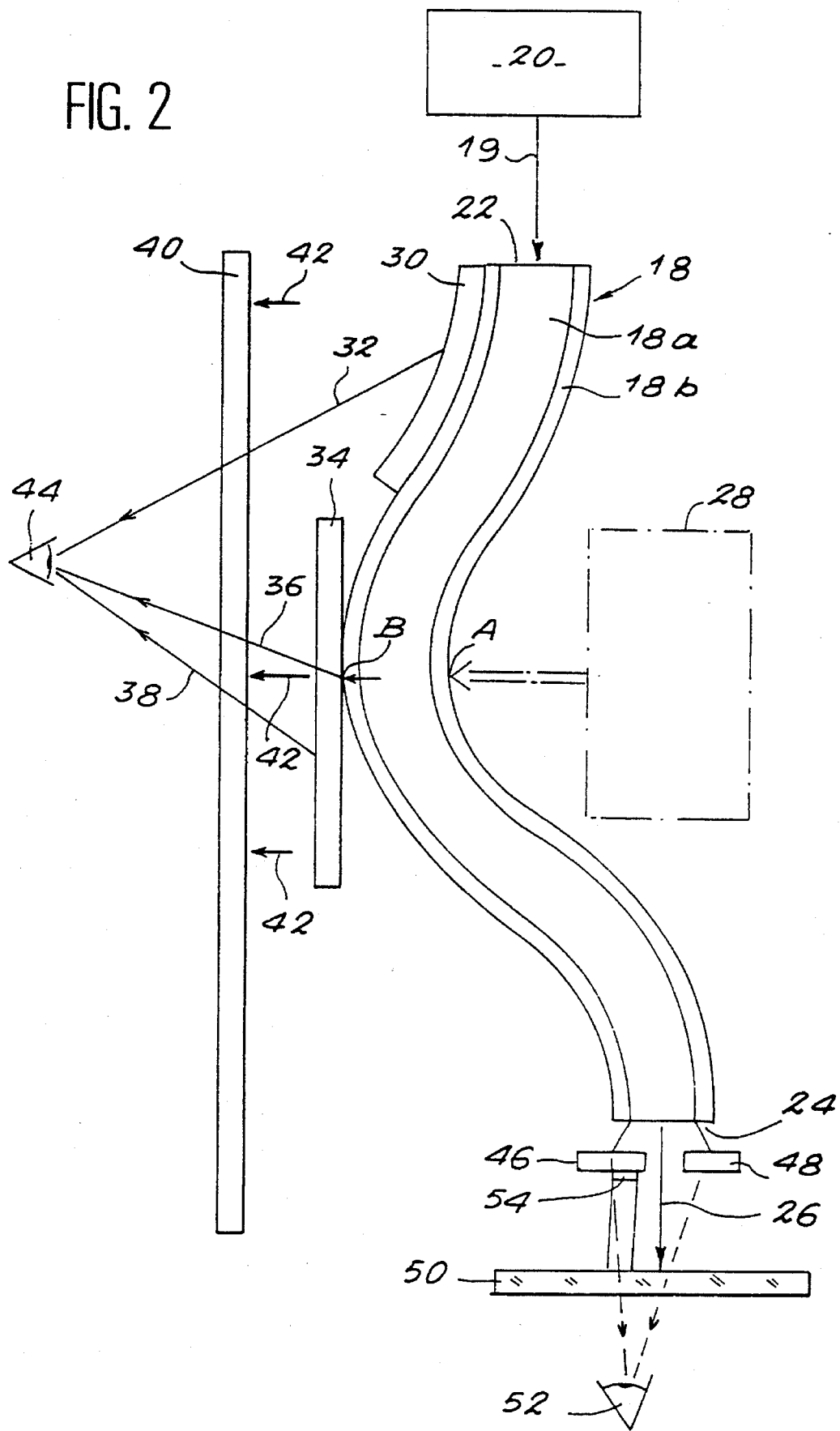

FIG. 2 A diagrammatic view of an embodiment of the unit according to the invention using various conversion elements.

Figure 3:
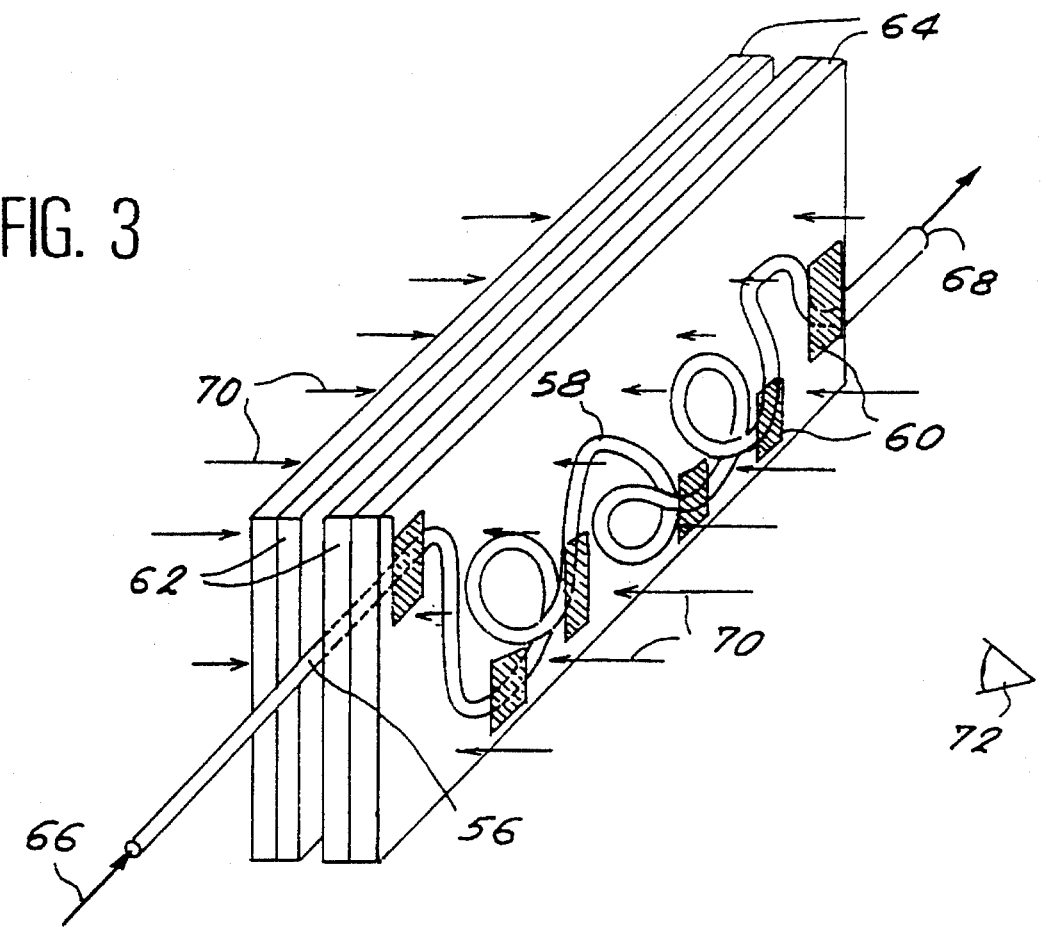

FIG. 3 A diagrammatic view of another embodiment using conversion elements in the form of plates.

Figure 4:
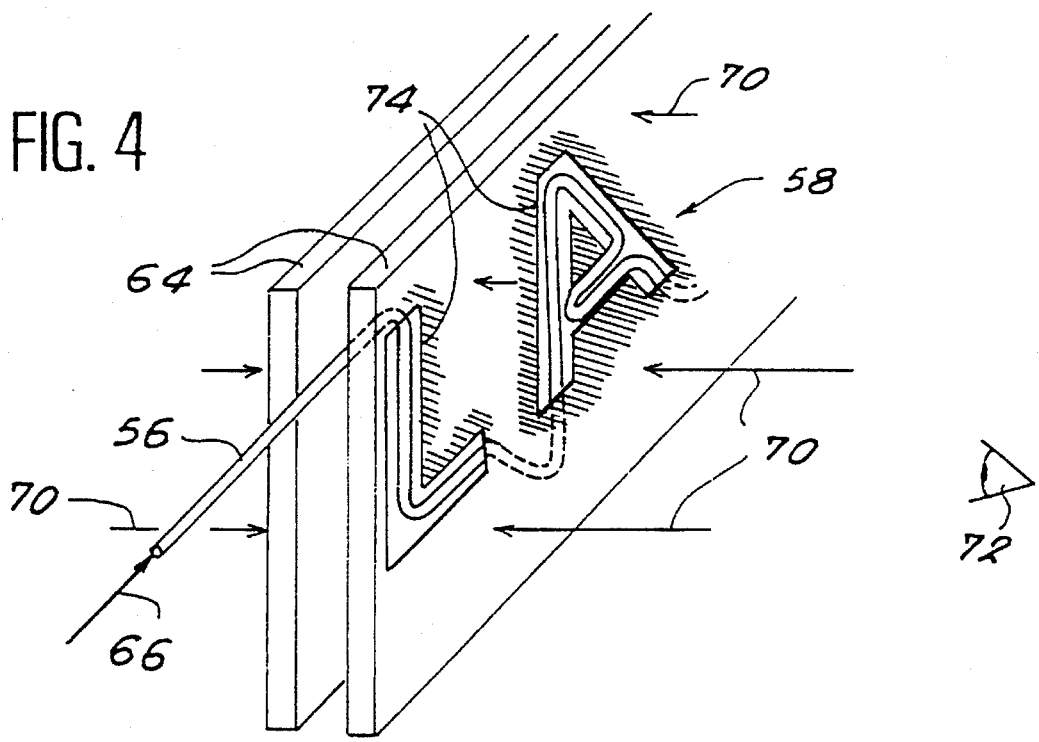

FIG. 4 A partial, diagrammatic view of another embodiment using conversion elements forming signs.

Figure 5:
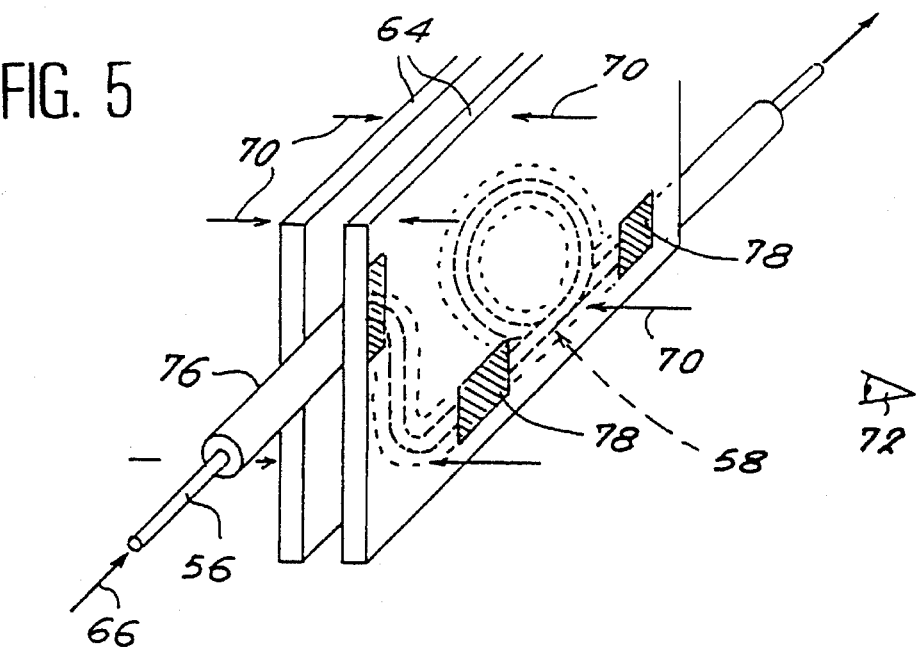

FIG. 5 A partial, diagrammatic view of another embodiment using a conversion element in cladding form.

Figure 6:
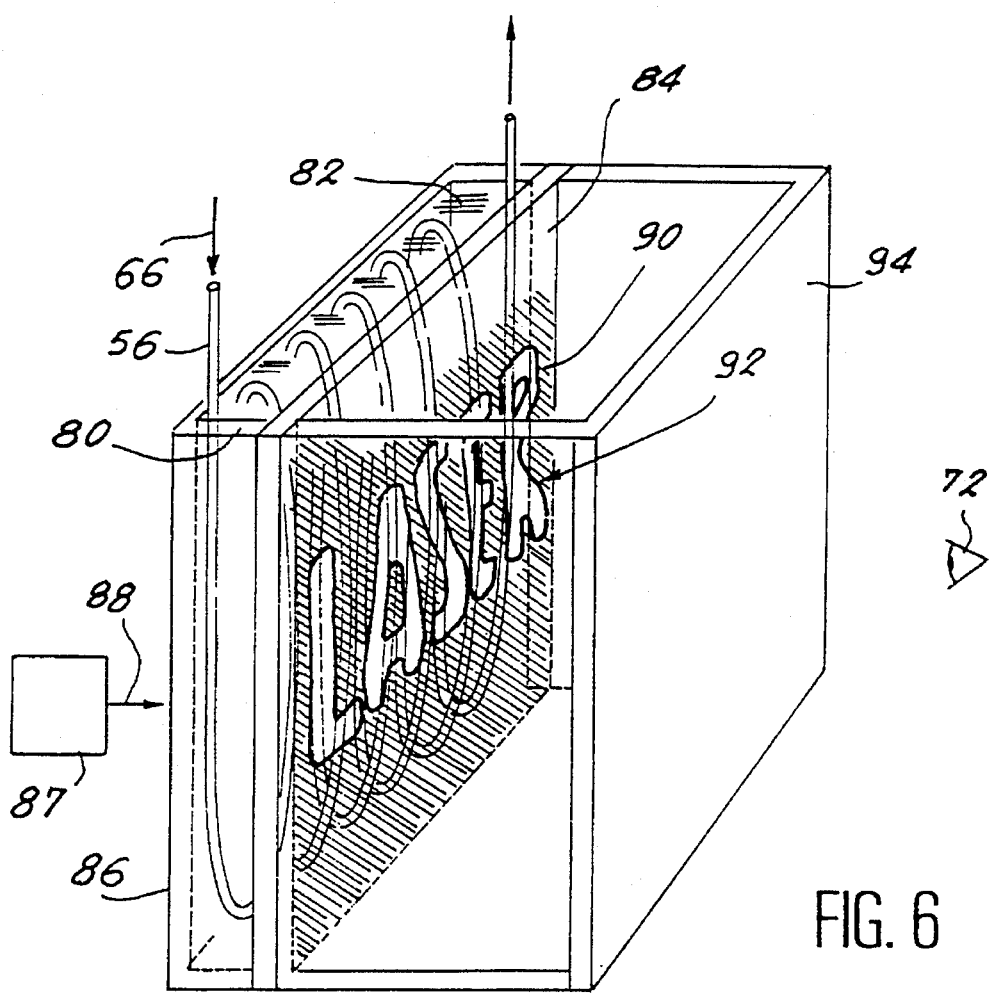

FIG. 6 A diagrammatic view of another embodiment using a liquid conversion element.

DETAILED DESCRIPTION OF THE PREFERRED EMBODIMENTS

The unit according to the invention and which is diagrammatically shown in FIG. 1 comprises:

an optical waveguide 2, such as an optical fibre, for transmitting a laser beam 4, means 6 for applying stresses to the optical waveguide 2 and which are diagrammatically represented by an arrow in FIG. 1 and which give rise to laser beam losses on the part of the guide 2, an element 8 for converting the laser beam, which is therefore lost by the guide 2, into a visible and incoherent light and a safety element 10 transparent to the visible and incoherent light emitted by the conversion element 8 and able to stop the residual laser beam liable to emerge from said conversion element.

Therefore the visible and incoherent light can be observed by a person 12 through the safety element 10.

The laser beam 4 from a not shown laser is coherent radiation dangerous for the eyes and, when injected into the guide 2, it propagates from the entrance to the exit of said guide, with a theoretical loss factor which is zero if the optical waveguide 2 is adapted or matched.

The stresses 6, which can be of a mechanical or other type, can be constant as a function of time, or conversely can vary as a function of time. These stresses, which deform the guide 2, mismatch said guide.

Part of the laser beam is then lost by the guide 2 along the latter, as is represented by the arrow 13 in FIG. 1.

The conversion element 8 is exposed to this part 13 of the laser beam, which is laterally lost by the guide 2 and converts said laser beam part into a visible and incoherent light, which is safe for the eyes of an observer and whose wavelength generally exceeds that of the laser beam.

The conversion element 8 contains a luminescent component, which is mineral or organic and which can be of the fluorescent type (i.e. non-persistent luminescence) or phosphorescent type (i.e. persistent luminescence).

The safety element 10 forms an optical window, which is transparent to the visible and incoherent light 14 from the conversion element 8, but which stops, generally by absorption, the residual laser radiation 16 liable to pass out of the conversion element 8.

The observer 12 can then observe in all safety the multiple luminous effects of the luminescent areas of the conversion element 8, which are exposed to the laser radiation lost by the optical waveguide 2.

These effects can be modulated (particularly by varying the stresses exerted on the optical waveguide) and various colours, shapes and light intensities can be observed by appropriately choosing the conversion element 8. The latter can have a luminescent dopant, whereof a choice will be made of the nature and percentage insertion into an element or onto the surface thereof.

According to the invention, said element can be solid, liquid or gaseous and may be fixed or mobile.

The unit according to the invention diagrammatically shown in FIG. 2 comprises a flexible, transparent optical fibre 18, into which is injected a visible laser beam 19, which is e.g. green and emitted by a laser 20.

The core and optical cladding of the fibre 18 respectively carry the references 18a and 18b.

The laser beam 19 injected into the core of the fibre 18 by its entrance face 22 passes out of the fibre by its exit face 24.

The laser exit beam 26 can be reinjected into the optical fibre 18 by not shown reinjection means but, in the case of FIG. 2, it is used in the manner described hereinafter.

When no stress is exerted on the fibre, its lateral brightness, which is due to very low laser beam losses, is itself very low.

The unit of FIG. 2 also comprises means 28 for exerting an e.g. mechanical stress at a point A of the fibre 18, which deforms the latter and gives rise to an intense green brightness at a point B of said fibre and which is due to a high laser beam loss on the part of the fibre at point B.

A first conversion element 30 is placed in contact with the optical cladding of the fibre 18 not far from the maximum deformation area thereof (in the vicinity of point A) and consequently receives a certain quantity of the lost laser beam. This transparent element 30, which e.g. has an orange luminescence, then emits an orange, incoherent light 32.

A second conversion element 34, which e.g. has a red luminescence, is placed in contact with the optical cladding of the fibre 18 at point B (diametrically opposite point A) and therefore emits an intense, red, incoherent light 36.

The other points of the conversion element 34 emit red light beams, such as 38, which are less intense.

The unit of FIG. 2 also comprises a safety element 40 placed in front of the conversion elements 30 and 34, which absorbs residual laser radiation 42 from the fibre 18, as well as elements 30, 34 transparent to the incoherent light 32, 36 and 38.

Therefore an observer 44 is safely able to see said lights 32, 36 and 38 through the safety element 40.

In the embodiment shown in FIG. 2, in front of the exit face 24 of the fibre 18 has been placed a transparent plate 26 having a yellow, fluorescent, non-persistent luminescence, as well as a plate 48 having a persistent, phosphorescent luminescence.

Another safety element 50 is positioned facing the plates 46 and 48 and absorbs the laser radiation reaching the same and which is transparent to the light emitted by the elements 46 and 48, so that an observer 52 can safely see said light through the element 50.

In the embodiment shown, a filtering or absorbing mask 54 is placed against the element 46, on the side of the element 50 and "codes by shade" the light from the element 46. By choosing an appropriate mask, it is consequently possible to reproduce previously chosen, geometrical luminous shapes.

The unit according to the invention and which is diagrammatically shown in FIG. 3, comprises a flexible, transparent optical fibre 56 (without a protective cladding). The fibre 56 is appropriately curved at several locations in order to represent signs or symbols, e.g. the word "laser".

The non-useful areas of these signs (in the example shown the areas defining the letters of the word "laser") are blocked off by masks 60.

Two plates 62 made from an organic, transparent material, e.g. having an orange luminescence by interaction with a green laser beam, are placed on either side of the optical fibre 56 and bear against the latter. Two other plates 64 constituting safety elements are respectively placed against the plates 62, so as to frame the assembly constituted by the said plates 62 and the fibre 56.

The plates 64 are made from an organic material transparent to orange light liable to be emitted by the plates 62, but able to absorb laser radiation liable to be lost by the optical fibre 56 when a laser beam 66 is injected into the latter.

In order to make the unit of FIG. 3 function, into one end of the fibre is injected a laser beam 66, which is green in the embodiment described, and said beam passes out by the other fibre end 68.

Mechanical stresses 70, which are constant as a function of time, are applied to the assembly formed by the plates 62, 64 and the fibre 56, as can be seen in FIG. 3.

In order to bring about these stresses, use is e.g. made of a plurality of screws and nuts (not shown), said screws passing from one side to the other of two groups of plates 62 and 64, whilst being mutually, regularly spaced along the edges of the plates. The nuts are screwed onto the corresponding screws, so as to lock, in the desired manner, the optical fibre between the two groups of plates 62 and 64.

The thus exerted stresses, as well as the curvatures of the optical fibre 56 give rise to laser beam losses at the letters of the word "laser" and an observer 72 facing one of the plates 64 can read the word "laser", whose orange luminescence increases with the rise in power of the not shown laser, which emits the beam 66. Thus, the losses of said beam 66 with respect to the letters of the word "laser" excite the luminescence of the plates 62 with respect to said letters.

The stresses 70 applied make it possible to balance the light efficiency of the unit.

A constructional variant of FIG. 3 is partly and diagrammatically shown in FIG. 4. In the case of FIG. 4, the optical fibre 56 (without protective cladding) represents the word "LASER" (it is possible to see the first two letters of the word in FIG. 4).

The plates 62 of FIG. 3 are here replaced by the elements 74, which are made from the same material as the plates 62, but respectively take on the shape of the letters of the word "LASER", as can be seen in FIG. 4. These elements 74 are respectively placed in front of the parts of the fibre 56 forming said word.

The protective plates 64 surround the assembly formed by the fibre 56 and the elements 74.

The stresses 70 are still applied to the assembly constituted by the plates 64, the elements 74 and the fibre 56, as can be seen in FIG. 4.

Taking up the example given hereinbefore, the screws would only traverse in the present case the plates 64. The observer 72, protected by the plates 64, can still read the orange coloured word "LASER".

FIG. 4 diagrammatically and partly shows another variant of the unit of FIG. 3. In FIG. 5, the optical fibre 56 takes on the shape of the word "LASER", the plates 62 being eliminated, but the fibre 56 without any protective cladding is provided with a cladding 76 made from a material which is luminescent (e.g. orange luminescence), when it receives the laser radiation lost by the fibre subject to stresses (the laser beam 66 again being injected into the fibre 56 by one end thereof). The plates 64 frame the thus clad fibre 56.

On the plates 64, the unit of FIG. 5 also has masks 78 for blocking off the light areas not useful to the design which it is wished to display. In the example shown, these masks 78 separate the different letters of the word "laser".

Under the effect of the stresses 70, the unit transmits light information to the observer 72 protected from the laser radiation by the plates 64.

Another unit according to the invention is diagrammatically shown in FIG. 6 and once again comprises the optical fibre 56, without any protective cladding and into which is injected the laser beam 66.

The unit of FIG. 6 once again comprises a tight tank 80 filled with a luminescent liquid 82 able to emit incoherent light visible when said liquid receives the laser radiation liable to be lost by the optical fibre 56.

The fibre is e.g. given the form of a solenoid, which is placed in the tank 80 and bears against the front face 84 and the rear face 86 of said tank. The front face of the latter is transparent to the light emitted by the liquid 82. The rear face 86 is flexible and is e.g. exposed, by appropriate means 87, to mechanical stresses 88 variable over a period of time and which are e.g. periodic as a function of time.

Thus, the fibre is exposed to periodic stresses and the laser beam losses, as well as the light emission by the liquid 82 also vary in time-periodic manner.

A mask 90 opaque to the light emitted by the liquid 82 is placed against the front face of the tank and has holes for forming the letters of the word "LASER" 92.

A safety element 94 is fixed to the tank 80 and positioned facing the perforated mask 90. This safety element absorbs the laser radiation liable to reach it and is transparent to the light emitted by the liquid 82.

Thus, an observer 72 protected by the element 94, sees the luminescence of the word "LASER" vary synchronously with the time-variable, mechanical pressures exerted on the flexible rear face of the tank 80.

In a purely indicative and in no way limitative manner, the plates 62 of FIG. 3 and the elements 74 of FIG. 4 are of the 3 mm thick material Fluo ORANGE of DACRYL, the cladding 76 of FIG. 5 is a flexible, transparent cladding internally coated with non-persistent, orange luminescent paint (e.g. Fluocolor, trademark of ALAC), the plates 64 of FIGS. 3, 4 and 5 are of 3 mm thick material Altuglas 500 of absorbent protection D6 for laser of class IV marketed by DACRYL, the liquid 82 of FIG. 6 is water to which fluorescein has been added and the element 94 of FIG. 6 is 3 mm thick Altuglas 500.

The unit according to the invention is more particularly used in the production of:

pedagogic equipment for optical instruction and training, laser operation signalling equipments (a unit according to the invention is able to represent the power rise of a laser by increasing luminescence of the conversion element thereof), ground lighting and guidance equipment insensitive to electric, magnetic and electromagnetic waves and usable at various locations (motorways, airstrips, snowed up areas) without any electric power supply and electric signs for advertising purposes.

I claim:

1. Display unit, characterized in that it comprises:

an optical waveguide for transmitting a laser beam, at least one element for converting the laser beam into visible and incoherent light, said conversion element being placed in front of the optical waveguide and at least one safety element placed in front of the said conversion element and which is transparent to the visible and incoherent light and able to stop the residual laser beam liable to emerge from the conversion element, so that the visible and incoherent light can be observed through the safety element.

2. Unit according to claim 1, characterized in that it also comprises means for applying stresses to the optical waveguide in order to bring about, on the part of the latter, laser beam losses and in that the conversion element is exposed to these laser beam losses.

3. Unit according to claim 2, characterized in that the waveguide is curved so as to form at least one sign and in that the conversion element is placed in front of said sign.

4. Unit according to claim 2, characterized in that it also comprises a mask opaque to the visible and incoherent light and which is positioned facing the conversion element and has at least one hole forming a sign.

5. Unit according to claim 2, characterized in that the conversion element is solid.

6. Unit according to claim 2, characterized in that the conversion element is a liquid.

7. Unit according to claim 6, characterized in that the optical waveguide is placed in said liquid.

8. Unit according to claim 2, characterized in that the conversion element forms a cladding around the optical waveguide.

9. Unit according to claim 2, characterized in that the stresses are constant as a function of time.

10. Unit according to claim 2, characterized in that the stresses are variable as a function of time.

11. Unit according to claim 1, characterized in that the conversion element is made from a non-persistent, fluorescent material.

12. Unit according to claim 1, characterized in that the conversion element is made from a persistent, phosphorus material.

* * * * *